(12) United States Patent
Corbin et al.

(10) Patent No.: US 8,976,003 B2
(45) Date of Patent: Mar. 10, 2015

(54) LARGE-SCALE DOCUMENT AUTHENTICATION AND IDENTIFICATION SYSTEM

(75) Inventors: George E. Corbin, Poughkeepsie, NY (US); Anthony Grech, Poughkeepsie, NY (US); Thomas E. Murphy, Jr., Poughkeepsie, NY (US); Mark Nelson, Poughkeepsie, NY (US); Kevin H. Peters, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1569 days.

(21) Appl. No.: 12/564,993

(22) Filed: Sep. 23, 2009

(65) Prior Publication Data

US 2011/0072272 A1 Mar. 24, 2011

(51) Int. Cl.
*G05B 19/00* (2006.01)
*G06F 21/64* (2013.01)

(52) U.S. Cl.
CPC ...................................... *G06F 21/64* (2013.01)
USPC ........... 340/5.6; 340/5.27; 340/5.3; 340/5.31; 340/5.65; 340/5.67; 340/5.74; 340/5.8; 340/5.86

(58) Field of Classification Search
None
See application file for complete search history.

(56) References Cited

U.S. PATENT DOCUMENTS

| | | | |
|---|---|---|---|
| 5,629,770 A | 5/1997 | Brassil et al. | |
| 6,970,870 B2 | 11/2005 | Dweck et al. | |
| 7,239,404 B2 | 7/2007 | Fukushima | |
| 7,293,098 B2 | 11/2007 | Sandhu et al. | |
| 7,387,261 B2 | 6/2008 | Onishi | |
| 7,613,317 B2* | 11/2009 | Lu ................... | 382/100 |
| 8,077,910 B2* | 12/2011 | Kuraki et al. .................. | 382/100 |
| 2003/0002708 A1* | 1/2003 | Pasqua ........................... | 382/100 |
| 2003/0145206 A1* | 7/2003 | Wolosewicz et al. .......... | 713/176 |
| 2004/0249817 A1 | 12/2004 | Liu | |
| 2005/0025338 A1* | 2/2005 | Zhao et al. ..................... | 382/100 |
| 2005/0066174 A1 | 3/2005 | Perlman | |
| 2005/0177559 A1 | 8/2005 | Nemoto | |
| 2006/0197928 A1 | 9/2006 | Hirai | |
| 2006/0271787 A1* | 11/2006 | DeYoung et al. .............. | 713/176 |
| 2007/0239792 A1 | 10/2007 | Chen et al. | |

(Continued)

OTHER PUBLICATIONS

U.S. Appl. No. 12/564,982, filed Sep. 23, 2009.

(Continued)

*Primary Examiner* — Curtis King
(74) *Attorney, Agent, or Firm* — Cantor Colburn LLP; William A. Kinnaman, Jr.

(57) ABSTRACT

Computer-implemented methods, systems, and computer program products for document authentication and identification using a large-scale distributed system are provided. A method includes receiving a digitized document at a trusted system managed by a trusted third-party that is separate from a creator of content in the digitized document. The digitized document is compared to a set of markers to determine whether the digitized document includes one or more of the markers, and in response thereto, information associated with the one or more markers is extracted using a decoder on the trusted system according to encoding strategies. The method further includes generating a comparison registration identifier on the trusted system as a summary of the extracted information and the one or more markers, and comparing the comparison registration identifier with a stored registration identifier in an encoding history via the trusted system to authenticate and identify the received digitized document.

17 Claims, 4 Drawing Sheets

(56) References Cited

U.S. PATENT DOCUMENTS

| | | |
|---|---|---|
| 2007/0255744 A1 | 11/2007 | Gideoni |
| 2008/0005024 A1 | 1/2008 | Kirkwood |
| 2008/0010352 A1 | 1/2008 | Donoho et al. |
| 2008/0022112 A1 | 1/2008 | Silverbrook et al. |
| 2008/0052775 A1 | 2/2008 | Sandhu et al. |
| 2008/0085052 A1 | 4/2008 | Sasamori et al. |
| 2008/0126805 A1 | 5/2008 | Owlett et al. |
| 2008/0164328 A1 | 7/2008 | Burn |
| 2008/0177594 A1 | 7/2008 | Lamoureux et al. |
| 2008/0180709 A1 | 7/2008 | Tsuchitoi |
| 2008/0180753 A1 | 7/2008 | Maeno |
| 2009/0044018 A1* | 2/2009 | Kirchner et al. ............... 713/176 |
| 2009/0092280 A1* | 4/2009 | Yamaguchi et al. .......... 382/100 |

OTHER PUBLICATIONS

Chris Alexander, et al., Improved User Authentication in Off-The-Record Messaging, WPES '07, Oct. 29, 2007, 7 pages.

* cited by examiner

FIG. 1

PURCHASE AGREEMENT

200

Buyer hereby agrees to purchase from Seller the widget machine described below, agrees to pay the purchase price, and agrees to honor the following terms and conditions.

Model: WidgetBuddy2000    Quantity:1    Price: $10,000 USD    
202

Buyer's Initials:___________

204

.

.

.

THE BUYER HAS THE RIGHT TO CANCEL THIS PURCHASE FOR ANY REASON AT ANY TIME PRIOR TO 12 MIDNIGHT OF THE 30TH CALENDAR DAY AFTER RECEIPT OF THE WIDGET MACHINE BY GIVING OR MAILING THE SELLER WRITTEN NOTICE OF CANCELLATION AND BY RETURNING THE WIDGET MACHINE, UNLESS THE WIDGET MAHCINE HAS BEEN SIGNIFICANTLY DAMAGED BEYOND REPAIR WHILE IN THE BUYER'S CONTROL.    
202

Buyer's Initials:___________

204

204

Buyer Printed Name:___________        Seller Printed Name:___________
Buyer Signature: ___________          Seller Signature: ___________
Date: _________                       Date: _________

FIG. 2

PURCHASE AGREEMENT

200

Buyer hereby agrees to purchase from Seller the widget machine described below, agrees to pay the purchase price, and agrees to honor the following terms and conditions.

Model: WidgetBuddy2000    Quantity:1    Price: $10,000 USD

Buyer's Initials:________

.
.
.

THE BUYER HAS THE RIGHT TO CANCEL THIS PURCHASE FOR ANY REASON AT ANY TIME PRIOR TO 12 MIDNIGHT OF THE 30TH CALENDAR DAY AFTER RECEIPT OF THE WIDGET MACHINE BY GIVING OR MAILING THE SELLER WRITTEN NOTICE OF CANCELLATION AND BY RETURNING THE WIDGET MACHINE, UNLESS THE WIDGET MAHCINE HAS BEEN SIGNIFICANTLY DAMAGED BEYOND REPAIR WHILE IN THE BUYER'S CONTROL.

Buyer's Initials:________

Buyer Printed Name:________    Seller Printed Name:________
Buyer Signature: ________    Seller Signature: ________
Date: ________    Date: ________

KA782971HYO91

402 — RECEIVE A DIGITIZED DOCUMENT AT A TRUSTED SYSTEM MANAGED BY A TRUSTED THIRD-PARTY SEPARATE FROM A CREATOR OF CONTENT IN THE DIGITIZED DOCUMENT

404 — CREATE A SET OF MARKERS ASSOCIATED WITH IDENTIFICATION INFORMATION

406 — SELECT AN ENCODING STRATEGY TO APPLY THE SET OF MARKERS TO THE DIGITIZED DOCUMENT AS IDENTIFYING TAGS

408 — APPLY THE SET OF MARKERS TO THE DIGITIZED DOCUMENT ACCORDING TO THE ENCODING STRATEGY TO PRODUCE A REGISTRATION IDENTIFIER UNIQUELY IDENTIFYING THE DIGITIZED DOCUMENT

410 — STORE A RECORD OF THE REGISTRATION IDENTIFIER, THE SET OF MARKERS, AND THE ENCODING STRATEGY ASSOCIATED WITH THE DIGITIZED DOCUMENT AS ENCODING HISTORY

412 — RECEIVE A RETURNED DIGITIZED DOCUMENT AT THE TRUSTED SYSTEM

414 — COMPARE THE RETURNED DIGITIZED DOCUMENT TO THE SET OF MARKERS TO DETERMINE WHETHER THE RETURNED DIGITIZED DOCUMENT INCLUDES ONE OR MORE OF THE MARKERS

416 — IN RESPONSE TO DETERMINING THAT THE RETURNED DIGITIZED DOCUMENT INCLUDES ONE OR MORE OF THE MARKERS, EXTRACT INFORMATION ASSOCIATED WITH THE ONE OR MORE MARKERS FROM THE RETURNED DIGITIZED DOCUMENT ACCORDING TO THE ENCODING STRATEGY

418 — GENERATE A COMPARISON REGISTRATION IDENTIFIER AS A SUMMARY OF THE EXTRACTED INFORMATION AND THE ONE OR MORE MARKERS

420 — COMPARE THE COMPARISON REGISTRATION IDENTIFIER WITH THE STORED REGISTRATION IDENTIFIER IN THE ENCODING HISTORY TO AUTHENTICATE AND IDENTIFY THE RETURNED DIGITIZED DOCUMENT

FIG. 4

LARGE-SCALE DOCUMENT AUTHENTICATION AND IDENTIFICATION SYSTEM

BACKGROUND

The present invention relates generally to document authentication, and more specifically, to identification and authentication of documents in both digital and analog formats, including hard copies of documents using a trusted third-party.

A variety of approaches may be used to identify the source of a document; however, many approaches do not survive conversions between electronic (digital) format and analog (e.g., hardcopy) format. For example, electronic documents may include digital signatures that can be delivered along with the documents. The recipients of the documents can validate the electronic documents using the digital signatures. Since the digital signatures are delivered with the documents, the recipients know that the documents have been signed.

Another approach to identifying the source of a document is intentional injection of false information into the document, such as inclusion of intentionally misspelled words or false entries in a directory. Presence of the erroneous or false information can be used as identifiers about the origin of the document. The document recipient is usually not aware of the false information, which is easily detected and only contains information about the creator.

A further approach to identifying source information is electronic image modification to embed hidden information. For instance, steganography allows for injection of information into an electronic image without significantly altering image quality and can be used to tag the image. Note that printing the encoded image results in losing the hidden information. Thus, the information does not survive digital-to-analog (printing) and subsequent analog-to-digital (scanning) conversion processes.

An additional identification encoding technique includes tagging print outs with watermarks. For example, printers can be designed to print information about the printer, such as a serial number in a light yellow color and in a very small font that is not visible to the naked eye. This information typically does not survive the analog-to-digital (scanning) conversion process.

Conventional notary services can be used to verify that a physical document was signed and establish a date of notarization. However, conventional notary services do not verify whether portions of the notarized document were later modified. The potential for future modification may be greater when the document is retained in an electronic format.

SUMMARY

An exemplary embodiment is a computer-implemented method for encoding identification information in a document using a large-scale distributed system. The method includes receiving a digitized document at a trusted system of the large-scale distributed system. The trusted system is managed by a trusted third-party separate from a creator of content in the digitized document. The method also includes creating a set of markers associated with identification information, and selecting an encoding strategy to apply the set of markers to the digitized document as identifying tags. The method further includes applying the set of markers to the digitized document according to the encoding strategy using an encoder on the trusted system to produce a registration identifier uniquely identifying the digitized document, and storing the registration identifier in an encoding history via the trusted system.

Another exemplary embodiment is a computer-implemented method for document authentication and identification using a large-scale distributed system. The method includes receiving a digitized document at a trusted system of the large-scale distributed system, where the trusted system is managed by a trusted third-party that is separate from a creator of content in the digitized document. The method also includes comparing the digitized document to a set of markers to determine whether the digitized document includes one or more of the markers, and in response to determining that the digitized document includes one or more of the markers, information associated with the one or more markers is extracted from the digitized document using a decoder on the trusted system according to encoding strategies. The method further includes generating a comparison registration identifier on the trusted system as a summary of the extracted information and the one or more markers, and comparing the comparison registration identifier with a stored registration identifier in an encoding history via the trusted system to authenticate and identify the received digitized document.

A further exemplary embodiment is a system for large-scale document authentication and identification using a trusted system managed by a trusted third-party separate from a creator of content in a digitized document. The trusted system includes an encoder configured to execute on a processing unit and receive the digitized document. The encoder is further configured to create a set of markers associated with identification information, and select an encoding strategy to apply the set of markers to the digitized document as identifying tags. The encoder is also configured to apply the set of markers to the digitized document according to the encoding strategy to produce a registration identifier uniquely identifying the digitized document. The encoder can store a record of the registration identifier, the set of markers, and the encoding strategy associated with the digitized document as encoding history. The trusted system also includes a decoder configured to execute on the processing unit and receive a returned digitized document. The decoder is configured to compare the returned digitized document to the set of markers to determine whether the returned digitized document includes one or more of the markers, and in response to determining that the returned digitized document includes one or more of the markers, information associated with the one or more markers is extracted from the returned digitized document according to the encoding strategy. The decoder is further configured to generate a comparison registration identifier as a summary of the extracted information and the one or more markers. The decoder is also configured to compare the comparison registration identifier with the stored registration identifier in the encoding history to authenticate and identify the returned digitized document.

The methods described herein can also be tangibly embodied as computer program products on readable storage media. Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Exemplary embodiments of the present invention provide a large-scale system for computer-implemented registration of identification information that survives both analog-to-digital and digital-to-analog conversion processes, such as scanning, copying, faxing and printing. Through applying encoding strategies to a set of markers and a document, a registration identifier representing the document is produced. The registration identifier can be written to an encoded version of the document or the registration identifier may be output as a separate record or receipt associated with the document. The markers used for uniquely identifying the document can include a combination of document attributes and/or other data. For example, markers can be tied to an author, date/time, body content, recipients, or data derived therefrom. When the document itself is encoded, the resulting encoded document can include the registration identifier hidden in plain sight, but the information used to create the registration identifier may not be readily apparent to a viewer of the encoded document. The registration identifier is recorded by a trusted third-party that is separate and independent from the document creator, which may provide increased confidence upon future verification for authentication and identification of the document.

Figure 1:
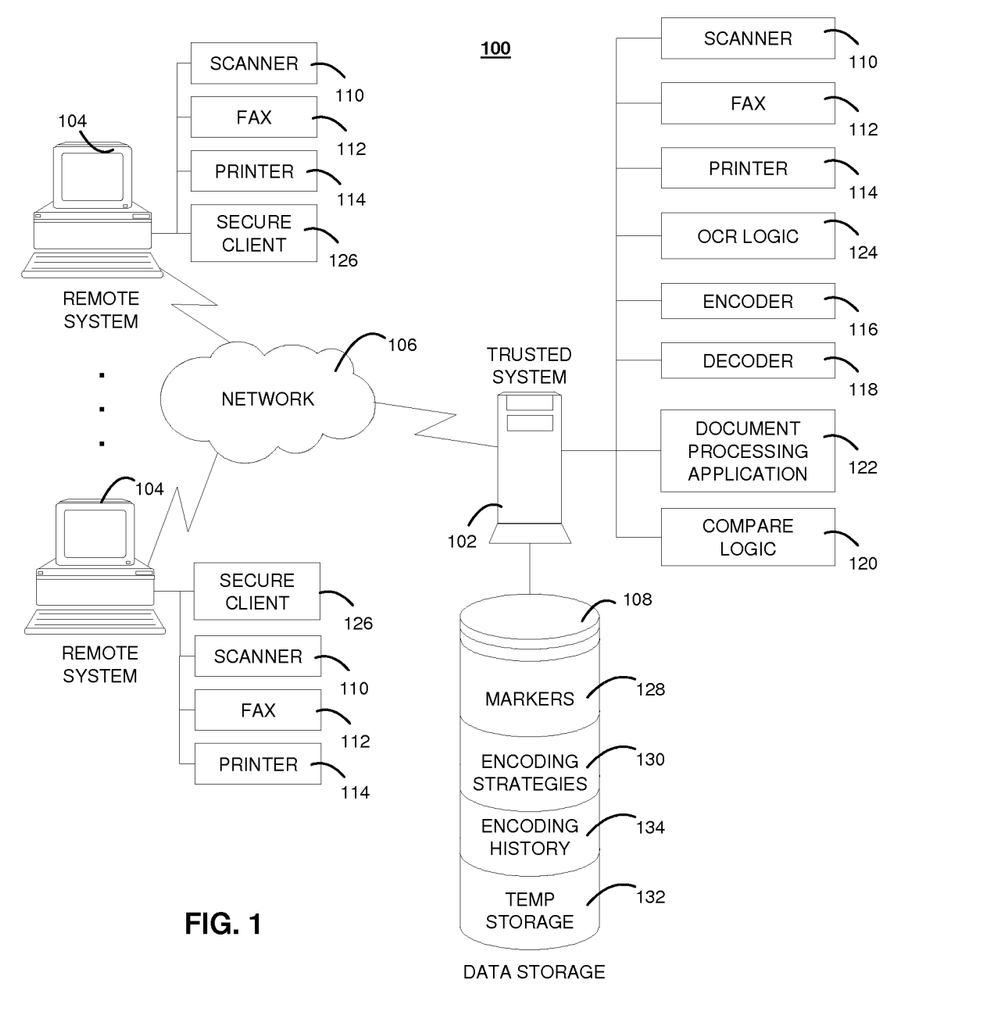
FIG. 1 depicts an example of a large-scale document authentication and identification system in accordance with exemplary embodiments.

Turning now to the drawings, it will be seen that in FIG. 1 there is a block diagram of a system 100 upon which large-scale document authentication and identification is implemented in exemplary embodiments. The system 100 of FIG. 1 includes a trusted system 102 in communication with remote systems 104 over a network 106. In exemplary embodiments, the trusted system 102 is a high-speed processing device (e.g., a mainframe computer, a desktop computer, a laptop computer, or the like) including at least one processing circuit (e.g., a CPU) capable of reading and executing instructions, and handling numerous interaction requests from the remote systems 104.

The trusted system 102 may interface with a variety of peripherals, such as data storage device 108, scanner 110, fax 112, and printer 114. In an exemplary embodiment, the trusted system 102 executes encoder 116, decoder 118, and compare logic 120. The trusted system 102 can also run other applications, such as document processing application 122 and optical character recognition (OCR) logic 124. The trusted system 102 can receive documents for processing from a variety of sources. For example, the trusted system 102 may receive a digitized document over the network 106 from the remote systems 104 as part of a service oriented architecture (SOA). The trusted system 102 can also receive facsimile documents via fax 112. Physical documents can be scanned via scanner 110 and converted from an image to character information using OCR logic 124.

In exemplary embodiments, the remote systems 104 comprise desktop, laptop, general-purpose computer devices, and/or networked devices with processing circuits and I/O interfaces, such as a keyboard and display device. The remote systems 104 can also interface with a variety of peripherals for digitizing, transmitting, and printing documents exchanged with the trusted system 102. For instance, the remote systems 104 may interface to scanners 110, faxes 112, and printers 114 locally available. The trusted system 102 and remote systems 104 can include various computer hardware and software technology known in the art, such as one or more processing units or circuits, volatile and non-volatile memory including removable media, power supplies, network interfaces, support circuitry, operating systems, and the like. Users can initiate various tasks locally on the remote systems 104, such as submitting or requesting document authentication and identification via secure clients 126. The secure clients 126 can access web pages or components and execute hypertext transfer protocol (HTTP)-enabled content sourced from the trusted system 102. The HTTP-enabled content may include secure HTTP, such as HTTP over a secure socket layer (HTTPS). The secure clients 126 may support other communication or transfer protocols known in the art.

The network 106 may be any type of communications network known in the art. For example, the network 106 may be an intranet, extranet, or an internetwork, such as the Internet, or a combination thereof. The network 106 can include wireless, wired, and/or fiber optic links. Additional computer systems (not depicted) can also be accessed via the network 106 or other networks.

The data storage device 108 refers to any type of computer readable storage medium and may comprise a secondary storage element, e.g., hard disk drive (HDD), tape, or a storage subsystem that is internal or external to the trusted system 102. Types of data that may be stored in the data storage device 108 include, for example, various files and databases. It will be understood that the data storage device 108 shown in FIG. 1 is provided for purposes of simplification and ease of explanation and is not to be construed as limiting in scope. To the contrary, there may be multiple data storage devices 108 utilized by the trusted system 102.

The trusted system 102 may also represent a cluster of computer systems collectively performing processes as described in greater detail herein. For example, the trusted system 102 can be geographically distributed at a variety of locations, such as at post offices or retail stores. Multiple locations can also operate on a single instance of a registered document, for instance, a national survey, with replies received at distributed locations for data consolidation and data mining.

In exemplary embodiments, once a digitized document is received from either the remote systems 104 or via OCR logic 124, the encoder 116 processes the digitized document at the trusted system 102. Processing performed by the encoder 116 can be configured using document-processing application 122. The document-processing application 122 can establish a set of markers 128 and configure encoding strategies 130 for the encoder 116.

The encoder 116 applies encoding strategies 130 with markers 128 to produce a registration identifier. The encoder 116 may also output an encoded document. Temporary storage 132 can be used to hold the digitized document and encoded document prior to printing via printer 114 or transmission via fax 112 or network 106. The encoding strategies 130 hold a number of different strategies that can vary depending upon the markers 128, associated document file types, and purpose for encoding. The encoder 116 can log information related to the encoding strategies 130, markers 128, digitized documents and encoded documents in encoding history 134.

An encoded document can be output as a physical, analog format for distribution or can be distributed in an electronic format. For example, an encoded document may be mailed or e-mailed to a recipient with the expectation of receiving the encoded document back at some point in the future, potentially with additional information added to the encoded document. As part of creating the markers 128, a user may provide the trusted system 102 with recipient data regarding potential document recipients, which may include name, address, e-mail, and other contact and permission information.

When a physical version of the encoded document is received after distribution, it can be scanned in and converted to an electronic format at the trusted system 102 or sent to the trusted system 102 from remote systems 104. The decoder 118 attempts to identify embedded information in a returned encoded document. The decoder 118 may search for the markers 128 according the encoding strategies 130 and cross-reference against the encoding history 134 to extract encoded information. The decoder 118 can also use a small amount of non-encoded information (such as title, author, date) stored in the database for document identification and determine which markers to use for authentication. The use of non-encoded information expedites the search within the database. The decoder 118 may also produce a decoded document. Encoded information that is extracted by the decoder 118 can be used to identify and authenticate the encoded document.

The markers 128 are items that are added or applied to a digitized document. The markers 128 can include a variety of subtle changes to the digitized document that do not alter semantic content in the resulting encoded document unless otherwise approved. The types of markers 128 that can be included in an encoded document may depend upon the file types of the digitized document and the encoded document. Example file types include DOC, TXT, PDF, JPG, GIF, HTML, and XML, and the others known in the art supporting text, image, and/or multi-media content.

One type of the markers 128 is based on presentation of information. Presentation based markers can be used for image-based documents or documents in which the originator has control of presentation attributes, such as the selection of tailored fonts. Semantically equivalent character substitution can be used for making individual marker variables, including punctuation and changing date formats. For instance, by using a list prefix for survey questions as a marker, difference variations such as: "1)", "1=", "1.", and so forth, can equate to different marker values, where ")" is marker type 1, "=" is marker type 2, "." is marker type 3, and so forth. Larger scale substitutions or rearrangements of character sequences represent another type of markers 128, including semantically equivalent word or phrase substitution. In a survey or list, the ordering of questions or sentences themselves can be used to encode information. For instance, in a questionnaire, if a particular sentence is used for question 2, the associated marker will have a particular value, but if the same sentence is used for a different question (on a different instance of the same survey) the associated marker has another value.

Further examples of the markers 128 include augmenting document content with content that does not otherwise appear as validation information. For instance, a signature quote can be selected and inserted into the encoded document. The signature quote may include specific characters that match or equate to a marker value that is calculated from the digitized document.

As a further option, the markers 128 can alter document content with the knowledge and permission of the user initiating the encoder 116. For example, the user may provide several variations of a phrase or sentence to substitute in a common location within the document. Sentence syntax can also be altered as another form of the markers 128. The encoder 116 can suggest changing sentence syntax. For instance, by avoiding the use of the verb "to be" or by using an arcane language construct such as an ablative absolute (e.g., "Having read the disclosure, the review committee asked questions"). Syntax alteration is least likely to be noticed when limited to a single or few sentence changes within a long document. Each of the markers 128 may indicate a sentence number that was changed.

The encoder 116 can apply the markers 128 to the digitized document by random selection of markers identified or based upon one or more attributes or characteristics of the digitized document, such as the author, originator, message/document content, sender, recipient, location of the recipient, and a creation time stamp. Additionally, the markers 128 can be programmatically created from derived data. For example, each digit of a postal zip code, with or without a four digit zip code extension, from a recipient's mailing address merge file can be encoded in the encoded document, with tracking information maintained in the encoding history 134. Whether an actual or derived attribute is used in the encoding strategies 130, the attribute does not necessarily have to be included in the encoded document.

The selection of markers 128 in combination with the encoding strategies 130 can be used to validate specific characteristics across unique encodings on a per document basis of the same base document, for instance, for unique recipients. As an example, if person A creates a memo for a distribution list including person B and person C, and uses encoding strategies 130 with markers 128 based on each recipient, then each recipient could receive a subtly different version of the encoded document. Each recipient version of the encoded document can be verified and instances from other parties would not pass verification. This approach may be used in forensic information leak detection.

The encoding strategies 130 do not have to be applied to every potential applicable instance of the markers 128 within the digitized document. For instance, sentence order variation may only change the order of several questions out of a long list of questions. The encoding strategies 130 can also select when the markers 128 are applied. The encoding strategies 130 may use a hash or other techniques, which generate characters or strings from which the markers 128 and application of the markers 128 can be selected.

In an exemplary embodiment, the markers 128 are used to identify key verification points of a document to construct a virtual fingerprint that uniquely identifies the document. The encoder 116 can use the markers 128 according to the encoding strategies 130 to calculate a unique check code for the digitized document, where the check code is stored in the encoding history 134 as a registration identifier. Rather than a simple checksum or cyclic redundancy check, the markers 128 can be used to establish the location and value of selected document features to ensure that modifications and rearrangements of document characters are detectable by the decoder 118 and compare logic 120.

Figure 2:
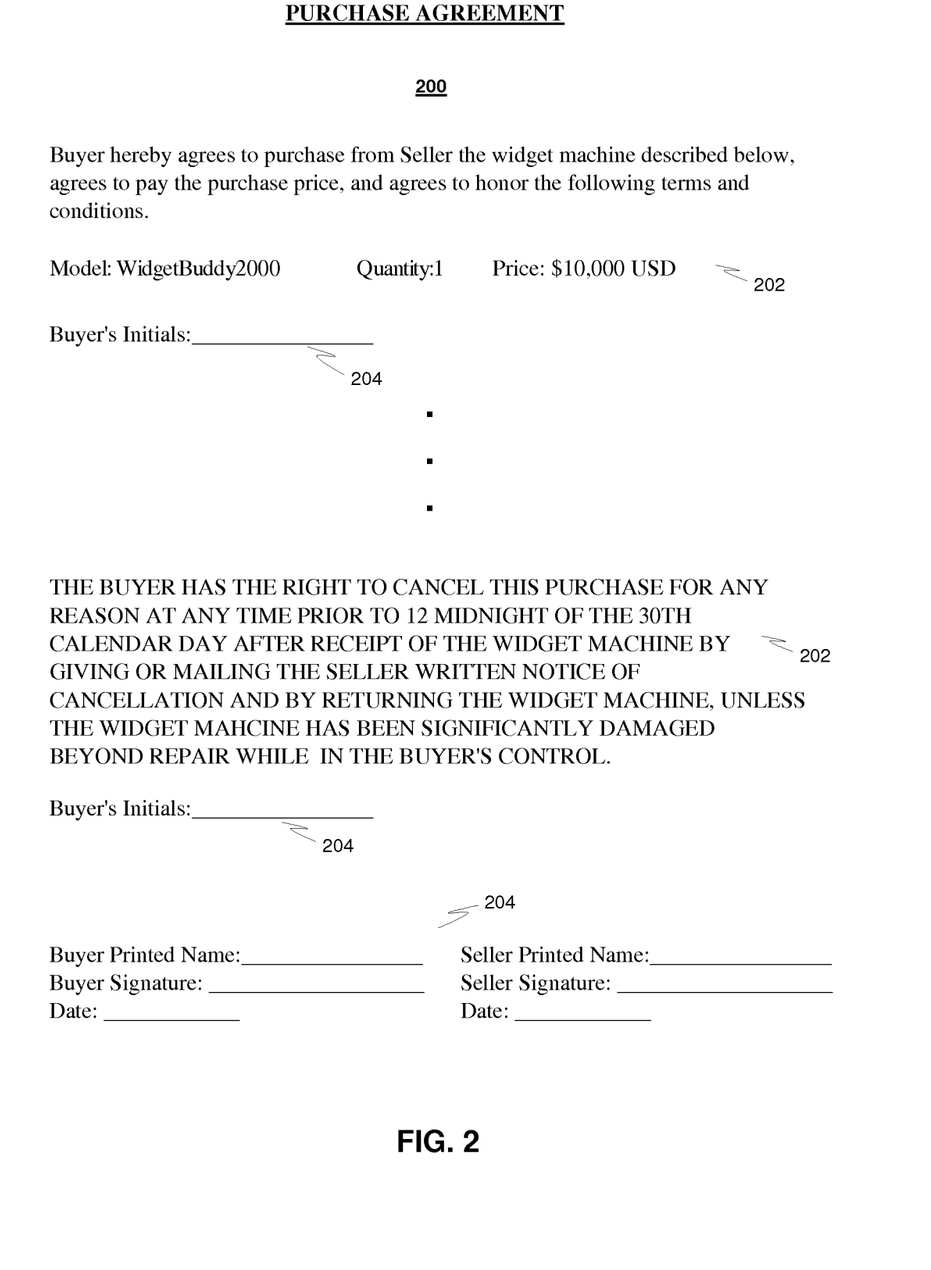
FIG. 2 depicts an example of an unmodified document.

The encoding strategies 130 may also define masked regions of a document to avoid including in the encoding, where such areas are likely to be modified prior to authentication and identification. An example is depicted in FIG. 2, where document 200 is a purchase agreement, including static text regions 202, and user-modifiable regions 204. Elements within the static text regions 202 can be used to create the set of markers 128 of FIG. 1 for document 200.

Figure 3:
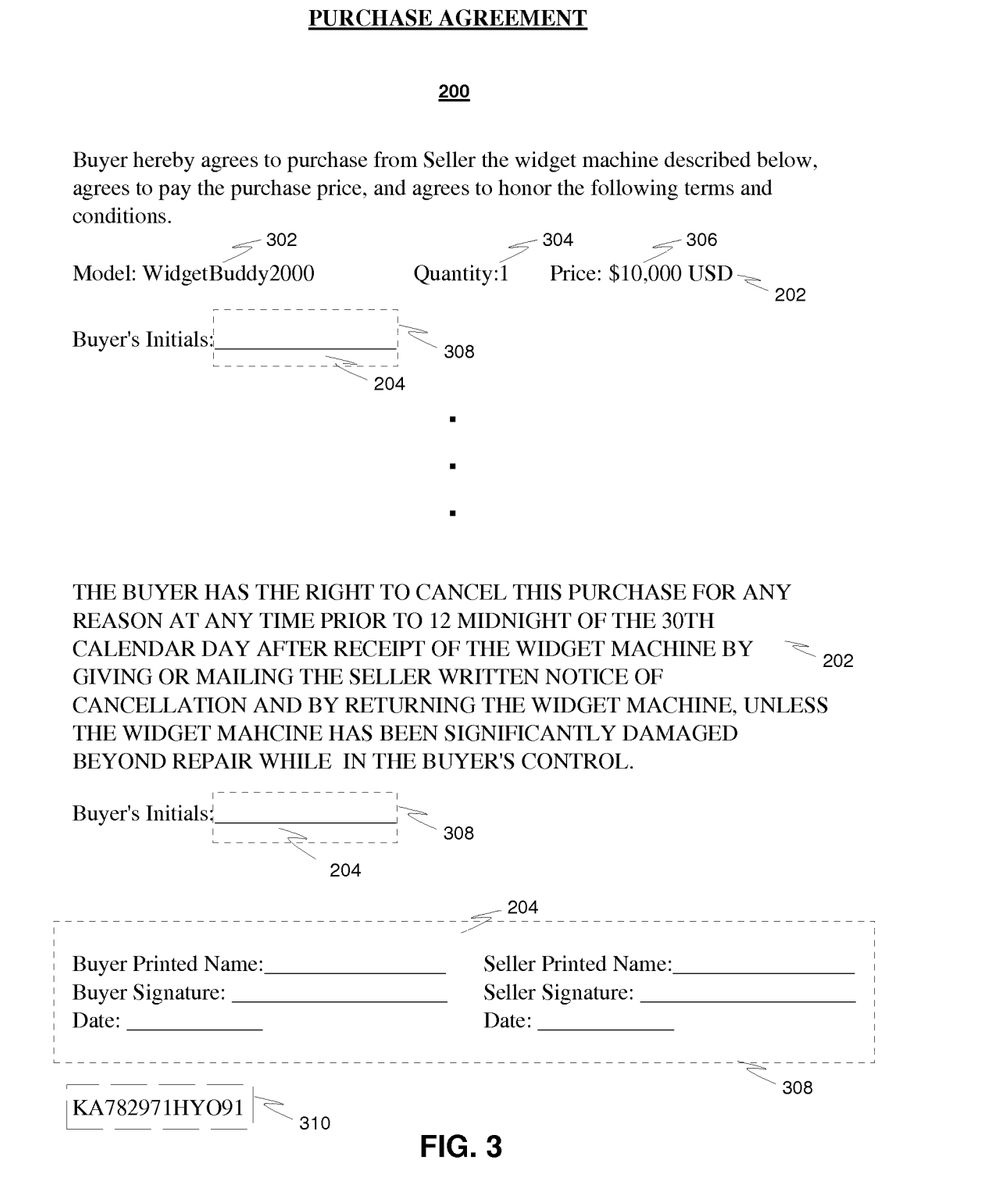
FIG. 3 depicts an example of a registered document in accordance with exemplary embodiments.

FIG. 3 depicts an example of a registered version of document 200 of FIG. 2. In FIG. 3, document content such as model data 302, quantity data 304, and price data 306 in static text regions 202 can be included in the set of markers 128 of FIG. 1. The set of markers 128 can also include additional elements and/or related information for the document 200. In FIG. 3, masking regions 308 are used to identify areas where modifications to the document 200 are expected, and therefore are not considered during the encoding process. Upon selecting and applying encoding strategies 130 to the set of markers 128 and the document 200, registration identifier 310 is produced. The registration identifier 310 is stored in encoding history 134 for use during later authentication and identification. The resulting registration identifier 310 can be written directly on the document 200 or output on a separate receipt.

Figure 4:
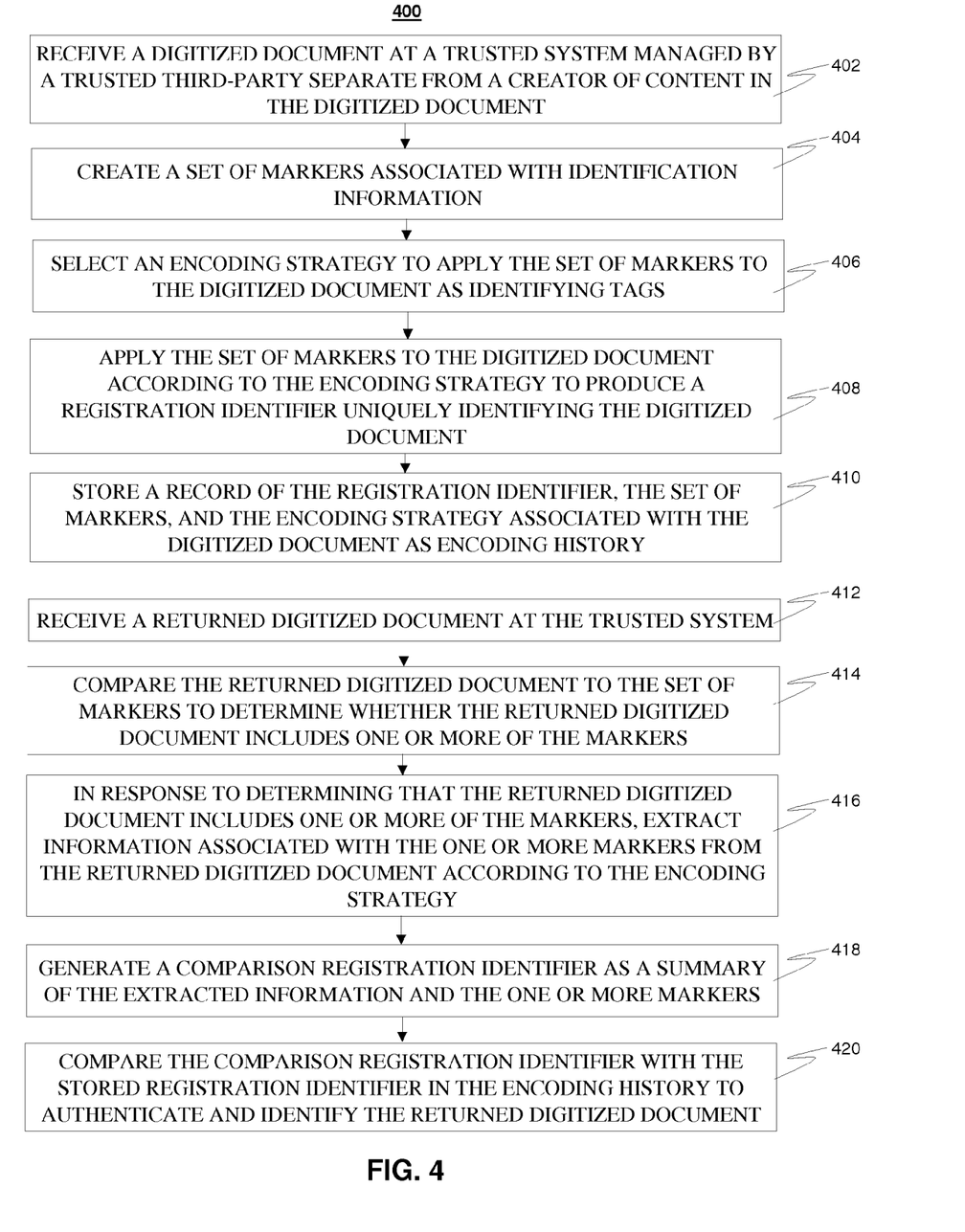
FIG. 4 depicts an exemplary process for large-scale document authentication and identification in accordance with exemplary embodiments.

Turning now to FIG. 4, a process 400 for large-scale document authentication and identification will now be described in accordance with exemplary embodiments, and in reference to FIGS. 1-3. At block 402, the trusted system 102 receives a digitized document. For example, the digitized document can represent an electronic version of the document 200 of FIGS. 2 and 3. The digitized document may be received at the trusted system 102 from one of the remote systems 104. Alternatively, the trusted system 102 can receive a scanned image of a physical copy of the digitized document from scanner 110 or fax 112. The trusted system 102 converts the scanned image into the digitized document by applying OCR logic 124 to the scanned image. The digitized document can be stored in temporary storage 132 during the encoding/decoding processes.

The trusted system 102 is managed by a trusted third-party separate from a creator of content in the digitized document. For example, a consumer can carry a hardcopy document to the trusted third-party for registration, or the consumer may electronically transmit the document to the trusted system 102. In an exemplary embodiment, the trusted third-party is an extended notary service. The trusted-third party may verify the identity of the consumer, and run the encoder 116 to produce a registration identifier associated with the document. The document processing application 122 may be used to access the digitized document, trigger execution of encoder 116, and configure markers 128 and encoding strategies 130. The encoder 116 can also output a modified copy of the digitized document as an encoded document, which may include identification tags hidden in plain sight.

The consumer or user of the trusted system 102 can select fields to use as identification information. At block 404, a set of markers 128 associated with identification information is created. The set of markers 128 can be accessed or modified using the document processing application 122 and/or the encoder 116. The user may determine the granularity of tracking depending upon which fields have been selected.

At block 406, the encoder 116 selects an encoding strategy from encoding strategies 130 to apply the set of markers 128 to the digitized document as identifying tags. To ensure uniqueness for a large number of encodings, the encoder 116 can examine a number of target documents being created and determine the number of markers 128 required to identify each document based upon the fields selected. The encoder 116 may request that the user select the desired markers.

At block 408, the encoder 116 applies the set of markers 128 to the digitized document according to the encoding strategy to produce a registration identifier uniquely identifying the digitized document. The encoder 116 can also output encoded documents with one or more characters replaced. The encoder 116 may create uniquely encoded documents for multiple targeted recipients of the document. The use of masking regions, such as masking regions 308 of FIG. 3, avoids applying the encoding strategies 130 to areas of the digitized document where modification is expected.

A variety of types of markers 128 can be supported in accordance with exemplary embodiments. For example, the encoder 116 may replace one or more characters or reorder one or more sentences, where the set of markers 128 indicate replaced character or sentence locations according to the encoding strategies 130. The encoder 116 can also insert a signature quote in response to receiving permission to modify the semantic content of the digitized document, where characters in the signature quote equate to the set of markers 128. As a further option, the encoder 116 may modify sentence syntax for at least one sentence in response to receiving permission to modify the semantic content of the digitized document, where the set of markers 128 indicate a modification location. The set of markers 128 can be selected based on attributes associated with the digitized document, including: author, originator, content, sender, recipient, location of the recipient, and a creation time stamp. Examples of document content that can serve as the markers 128 include model data 302, quantity data 304, and price data 306 in static text regions 202 of FIG. 3 to produce registration identifier 310.

At block 410, a record of the registration identifier, the set of markers 128 and encoding strategy associated with the encoded documents is stored in encoding history 134. The encoding history 134 can also identify the consumer requesting the encoding as well as targeted recipients of the document. The encoded documents may be sent to recipients electronically or in a physical hardcopy format. A small amount of non-encoded data may be associated with the document to expedite document identification and determine which markers should be checked for authentication.

After a period of time, a returned document is received that may be in a physical format or in a digitized format. A returned physical document can be converted into a digitized format using scanner 110 and OCR logic 124. The returned digitized document is examined to determine whether it is a specific registered document. At block 412, the trusted system 102 receives the returned digitized document. At block 414, the compare logic 120 can compare the returned digitized document to the set of markers 128 to determine whether the returned digitized document includes one or more of the markers 128.

At block 416, in response to determining that the returned digitized document includes one or more of the markers 128, the compare logic 120 can initiate the decoder 118 to extract information associated with the one or more markers from the returned digitized document according to the encoding strategies 130. At block 418, the compare logic 120 generates a comparison registration identifier as a summary of the extracted information and the one or more markers 128. In an exemplary embodiment, the comparison registration identifier is a type of check word equivalent to removing encoding from the returned digitized document and applying the markers 128 according to the encoding strategies 130. The comparison registration identifier can be held in temporary storage 132.

At block 420, the compare logic 120 compares the comparison registration identifier with the stored registration identifier in the encoding history 134 to authenticate and identify the returned digitized document. The compare logic 120 outputs a pass/fail message as an indication of whether the returned digitized document has been modified. By examining the markers 128, the encoding strategies 130, and the encoding history 134, the decoder 118 can extract the encoded information. For instance, associations between values and locations in document content can map to specific encoded information as tracked in the encoding history 134. The decoder 118 may also store a resulting decoded document.

The capabilities of the present invention can be implemented in software, firmware, hardware or some combination thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized to store instructions for execution of the OCR logic 124, encoder 116, decoder 118, compare logic 120, and/or document processing application 122 of FIG. 1. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Technical effects include computer-implemented encoding and decoding of identification information that survives both analog-to-digital and digital-to-analog conversion processes. Document encoding strategies can be applied to a set of markers and a digitized document to generate a unique registration identifier. The registration identifier is sensitive to changes in content within an associated document. The registration identifier can be written into the document as encoded values hidden in plain sight or can be written as a visible identifier on the document or on a receipt associated with the document. Encoding variations can be applied based on intended recipients of the encoded documents, which later provide authentication and identification information when the registered documents are validated. Through interpretation of encoded markers, document attributes can be verified, and tampering or modification of the registered document can be detected using a trusted system controlled by a third party, such as an electronic notary public.

The diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Moreover, the use of the terms first, second, etc. do not denote any order or importance, but rather the terms first, second, etc. are used to distinguish one element from another.

What is claimed is:

1. A computer-implemented method for encoding identification information in a document using a large-scale distributed system, comprising:
   receiving a digitized document at a trusted system of the large-scale distributed system, the trusted system managed by a trusted third-party separate from a creator of content in the digitized document;
   creating a set of markers associated with identification information;
   selecting an encoding strategy to apply the set of markers to the digitized document as identifying tags;
   applying the set of markers to the digitized document according to the encoding strategy using an encoder on the trusted system to produce a registration identifier uniquely identifying the digitized document, the encoding strategy including masking regions of the digitized document as areas to avoid applying the encoding strategy based on determining that the regions of the digitized document are expected to be modified; and
   storing the registration identifier in an encoding history via the trusted system.

2. The method of claim 1 wherein the digitized document is received at the trusted system from a remote system of the large-scale distributed system.

3. The method of claim 1 further comprising:
   scanning a physical copy of the digitized document as a scanned image; and
   creating the digitized document by applying optical character recognition (OCR) logic to the scanned image.

4. The method of claim 1 further comprising:
   selecting the set of markers based on attributes associated with the digitized document, the attributes comprising one or more of: author, originator, content, sender, recipient, location of the recipient, and a creation time stamp.

5. The method of claim 1 further comprising:
   storing a record of the set of markers and the selected encoding strategy associated with the registration identifier in the encoding history.

6. The method of claim 1 further comprising:
   outputting an encoded document as an encoded version of the digitized document associated with the registration identifier, wherein the encoded document is generated by the encoder, the encoded document retains semantic content of the digitized document absent permission to modify the semantic content of the digitized document, and the encoder further performs one or more of:
   replacing one or more characters;
   reordering one or more words, phrases, or sentences;
   inserting a signature quote; and
   modifying sentence syntax for at least one sentence in response to receiving permission to modify the semantic content of the digitized document.

7. A computer-implemented method for document authentication and identification using a large-scale distributed system, comprising:
   receiving a digitized document at a trusted system of the large-scale distributed system, the trusted system managed by a trusted third-party separate from a creator of content in the digitized document;
   comparing the digitized document to a set of markers to determine whether the digitized document includes one or more of the markers;
   in response to determining that the digitized document includes one or more of the markers, extracting information associated with the one or more markers from the digitized document using a decoder on the trusted system according to encoding strategies, the encoding strategies including masking regions of the digitized document as areas to avoid extracting information from the digitized document, the masking regions formed based on determining that the masking regions of the digitized document are expected to be modified;
   generating a comparison registration identifier on the trusted system as a summary of the extracted information and the one or more markers; and
   comparing the comparison registration identifier with a stored registration identifier in an encoding history via the trusted system to authenticate and identify the received digitized document.

8. The method of claim 7 wherein the digitized document is received at the trusted system from a remote system of the large-scale distributed system.

9. The method of claim 7 further comprising:
selecting the set of markers based on attributes associated with the digitized document, the attributes comprising one or more of: author, originator, content, sender, recipient, location of the recipient, and a time stamp.

10. A system for large-scale document authentication and identification, comprising:
a trusted system managed by a trusted third-party separate from a creator of content in a digitized document, the trusted system comprising:
an encoder configured to execute on a processing unit and perform a method comprising:
receiving the digitized document;
creating a set of markers associated with identification information;
selecting an encoding strategy to apply the set of markers to the digitized document as identifying tags, the encoding strategy including masking regions of the digitized document as areas to avoid applying the encoding strategy based on determining that the regions of the digitized document are expected to be modified;
applying the set of markers to the digitized document according to the encoding strategy to produce a registration identifier uniquely identifying the digitized document; and
storing a record of the registration identifier, the set of markers, and the encoding strategy associated with the digitized document as encoding history; and
a decoder configured to execute on the processing unit and perform a method comprising:
receiving a returned digitized document;
comparing the returned digitized document to the set of markers to determine whether the returned digitized document includes one or more of the markers;
in response to determining that the returned digitized document includes one or more of the markers, extracting information associated with the one or more markers from the returned digitized document according to the encoding strategy;
generating a comparison registration identifier as a summary of the extracted information and the one or more markers; and
comparing the comparison registration identifier with the stored registration identifier in the encoding history to authenticate and identify the returned digitized document.

11. The system of claim 10 further comprising:
optical character recognition (OCR) logic, the OCR logic configured to execute on the processing unit and create the digitized document and the returned digitized document from one or more scanned images of one or more physical documents; and
a document processing application configured to execute on the processing unit and provide interfaces to the encoder, decoder, and OCR logic.

12. The system of claim 10 wherein the digitized document is received at the trusted system from a remote system of the large-scale distributed system.

13. The system of claim 10 wherein the set of markers is selected based on attributes associated with the digitized document, the attributes comprising one or more of: author, originator, content, sender, recipient, location of the recipient, and a time stamp.

14. The system of claim 10 wherein the encoder is further configured to perform one or more of: replacing one or more characters, reordering or replacing words or phrases, reordering one or more sentences, inserting a signature quote, and modifying sentence syntax for at least one sentence in response to receiving permission to modify the semantic content of the digitized document; and
the decoder is further configured to determine that the one or more markers comprise at least one of: one or more replaced characters, one or more reordered sentences, an inserted signature quote with information encoded in characters of the signature quote, and a modified sentence syntax with the information encoded in a modified location.

15. A computer program product for document identification and authentication using a large-scale distributed system, the computer program product comprising:
a non-transitory storage medium readable by a processing circuit and storing instructions for execution by the processing circuit for implementing a method, the method comprising:
receiving a digitized document at a trusted system of the large-scale distributed system, the trusted system managed by a trusted third-party separate from a creator of content in the digitized document;
creating a set of markers associated with identification information;
selecting an encoding strategy to apply the set of markers to the digitized document as identifying tags, the encoding strategy including masking regions of the digitized document as areas to avoid applying the encoding strategy based on determining that the regions of the digitized document are expected to be modified;
applying the set of markers to the digitized document according to the encoding strategy using an encoder on the trusted system to produce a registration identifier uniquely identifying the digitized document; and
storing a record of the registration identifier, the set of markers, and the encoding strategy associated with the digitized document as encoding history.

16. The computer program product of claim 15 wherein the method further comprises:
receiving a returned digitized document at the trusted system;
comparing the returned digitized document to the set of markers to determine whether the returned digitized document includes one or more of the markers;
in response to determining that the returned digitized document includes one or more of the markers, extracting information associated with the one or more markers from the returned digitized document according to the encoding strategy;
generating a comparison registration identifier on the trusted system as a summary of the extracted information and the one or more markers; and
comparing the comparison registration identifier with the stored registration identifier in the encoding history via the trusted system to authenticate and identify the returned digitized document.

17. The computer program product of claim 16 wherein the digitized document and the returned digitized document are received at the trusted system from one or more remote systems of the large-scale distributed system.

* * * * *